United States Patent [19]

Waisbrod

[11] Patent Number: 4,636,106
[45] Date of Patent: Jan. 13, 1987

[54] COAXIAL JOINT

[75] Inventor: Neville Waisbrod, Shimshon, Israel

[73] Assignee: Tzora Furniture Industries Ltd., Bet Shemesh, Israel

[21] Appl. No.: 791,609

[22] Filed: Oct. 25, 1985

[30] Foreign Application Priority Data

Oct. 26, 1984 [IL] Israel .......................... 73328

[51] Int. Cl.⁴ .......................... F16B 12/42; F16D 1/00
[52] U.S. Cl. .................................. 403/228; 403/225;
403/221; 403/298; 403/372
[58] Field of Search .............. 403/228, 225, 221, 222,
403/162, 372, 227, 226, 298, 295; 384/222, 296

[56] References Cited

U.S. PATENT DOCUMENTS

| | | | |
|---|---|---|---|
| 1,647,387 | 11/1927 | Wood | 384/296 |
| 1,839,094 | 12/1931 | Geyer | 403/228 |
| 2,165,920 | 7/1939 | Burnip | 403/228 |
| 2,297,483 | 9/1942 | Kuhne | 403/227 |
| 2,578,809 | 12/1951 | Ketchum | 403/225 |
| 3,215,477 | 11/1965 | Arthur | 384/222 |
| 3,515,417 | 6/1970 | Bowman | 403/372 |
| 3,932,048 | 1/1976 | DuPont | 403/225 |

FOREIGN PATENT DOCUMENTS

| | | | |
|---|---|---|---|
| 955900 | 1/1950 | France | 403/228 |
| 1432449 | 2/1966 | France | 403/225 |
| 2191636 | 2/1974 | France . | |
| 500390 | 11/1954 | Italy | 403/228 |
| 213019 | 3/1924 | United Kingdom | 403/228 |
| 1546432 | 5/1979 | United Kingdom . | |

Primary Examiner—Cornelius J. Husar
Assistant Examiner—Todd G. Williams
Attorney, Agent, or Firm—Benjamin J. Barish

[57] ABSTRACT

A coaxial joint for joining inner and outer cylindrical members permitting rotational and/or linear movement between them, comprises an outer bushing sleeve non-rotatably receivable within the outer cylindrical member, an inner bushing sleeve formed with a central bore for receiving the inner cylindrical member; a first group of longitudinally-extending, circumferentially-spaced ribs formed between the inner and outer sleeves; and a second group of such ribs formed in staggered relationship with respect to the first group on the outer face of the outer sleeve and effective, when forcibly received within the outer cylindrical member, to distort inwardly the portions of the outer sleeve between the first group of ribs and thereby to minimize the distortion of the inner sleeve.

20 Claims, 7 Drawing Figures

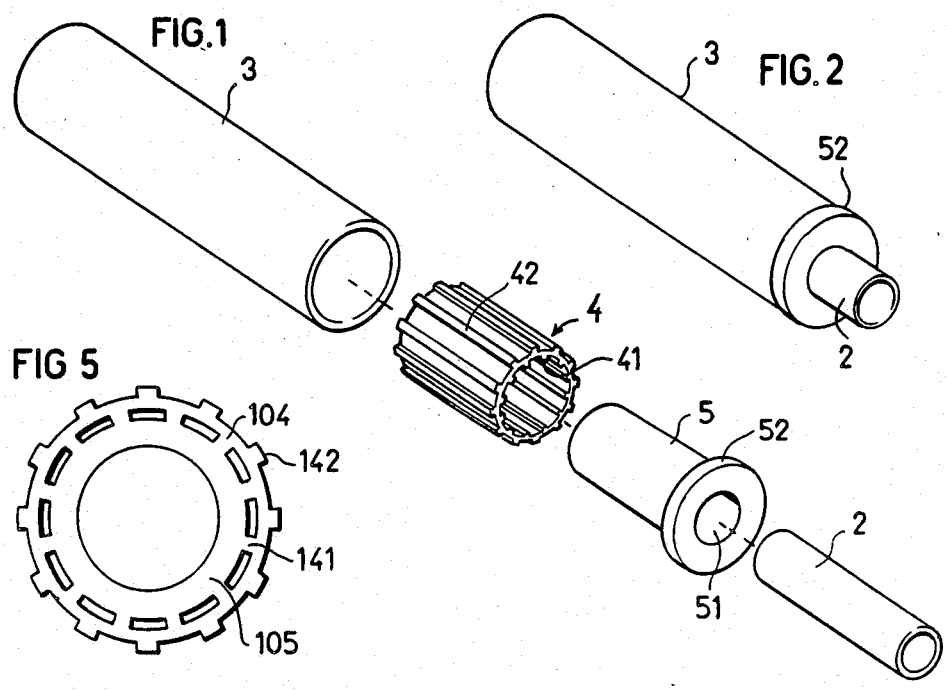
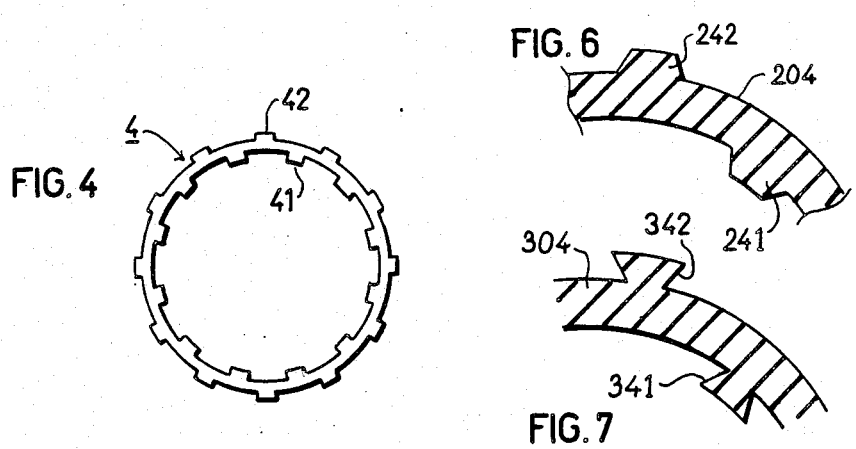

COAXIAL JOINT

BACKGROUND OF THE INVENTION

The present invention relates to coaxial joints, and particularly to joints for joining an inner cylindrical member to an outer cylindrical member while permitting rotary and/or linear movements between the two members.

Coaxial joints of the foregoing type commonly include a bushing disposed between the two cylindrical members, which bushing is non-rotatably received within the outer cylindrical member and includes a bore for rotatably receiving the inner cylindrical member. Such bushings are usually made of hard plastic material and are forcibly inserted into the outer cylindrical member so as to provide a firm, non-rotatable gripping thereof. The dimensions of the bore through the bushing are very critical in order to prevent any significant play when the inner cylindrical member is rotatably received within it. Therefore the conventional practice is to ream the final critical dimensions of the bore after the bushing has been forcibly introduced into the outer cylindrical member so as to compensate for any distortions of the bushing during this process. However, this reaming step adds substantially to the production costs of such a joint.

An object of the present invention is to provide a coaxial joint having a bushing of a construction such that the distortion of the bushing bore is substantially reduced or eliminated during the insertion of the bushing into the outer cylindrical member, so as to obviate the need for the usual reaming step.

SUMMARY OF THE INVENTION

According to a broad aspect of the present invention, there is provided a coaxial joint for joining an inner cylindrical member to an outer cylindrical member by means of a bushing disposed between the two cylindrical members, characterized in that the bushing includes: an outer sleeve non-rotatably received within the outer cylindrical member; an inner sleeve formed with a central bore for receiving the inner cylindrical member; a first group of longitudinally-extending, circumferentially-spaced ribs formed between the inner and outer sleeves with each such rib having a width which is substantially smaller that the circumferential spacing between ribs; and a second group of longitudinally-extending, circumferentially-spaced ribs each also having a width which is substantially smaller than the circumferential spacing between ribs, said second group of ribs being formed in staggered relationship with the first group of ribs in the outer face of the outer sleeve and effective, when the outer sleeve is forcibly received within the outer cylindrical member, to distort inwardly the portions of the outer sleeve between the first group of ribs, and thereby to minimize the distortion of the inner sleeve.

Such a bushing may be produced with an originally-formed bore having the critical dimensions required to rotatably receive the inner cylindrical member without "play", and thereby obviates the need for reaming the bore after the bushing has been assembled within the outer cylindrical member.

Preferably, the bushing includes two sections, namely an inner section comprising the inner sleeve, and an outer section comprising the outer sleeve and the two groups of ribs formed on its inner and outer faces, respectively. It is contemplated, however, that the bushing can be made as a single unit integrally formed with the inner and outer sleeves and the two groups of ribs.

Further features and advantages of the invention will be apparent from the description below.

BRIEF DESCRIPTION OF THE DRAWINGS

The invention is herein described, by way of example only, with reference to the accompanying drawings, wherein:

FIG. 1 is an exploded perspective view illustrating the main elements of a coaxial joint constructed with the in accordance with the present invention;

FIG. 2 is a three dimensional view of the assembled joint of FIG. 1;

FIG. 3 is a longitudinal sectional view of FIG. 2;

FIG. 4 is an end elevational view illustrating the outer bushing sleeve of the joint of FIGS. 1–3;

FIG. 5 is an end elevational view illustrating a modification in the construction of the bushing; and FIGS. 6 and 7 are enlarged fragmentary views illustrating variations in the configuration of the ribs formed in the bushing.

DESCRIPTION OF PREFERRED EMBODIMENTS

The joint illustrated in FIGS. 1–3 is used for joining an inner cylindrical member 2 to an outer cylindrical member 3 such as to permit rotation and/or linear movement of member 2 with a minimum of play with respect to member 3. One application for such a joint is in rotatably mounting a chair seat to a chair base, wherein cylindrical member 3 is fixed to the chair base and cylindrical member 2 carries the chair seat so as to permit rotation of the seat with respect to the base.

The rotatable mounting of member 2 with respect to member 3 is effected by the use of a bushing constituted of two coaxial sleeves, namely an outer sleeve 4 and an inner sleeve 5. The outer sleeve 4 is forcibly introduced into the outer cylindrical member 3 so as to be tightly and non-rotatably pressed-fitted therein; and the inner sleeve 5 is similarly forcibly introduced into the outer sleeve 4 so as to be tightly and non-rotatably press-fitted therein. The inner cylindrical member 2 is received within the inner sleeve 5 so as to be rotatable therein with very little play, as will be described more particularly below.

The outer bushing sleeve 4 is formed with two groups of longitudinally-extending, circumferentially-spaced ribs 41, 42. The first group of ribs 41 are formed on the inner face of the sleeve, and the second group of ribs 42 are formed on the outer face of the sleeve as clearly seen in FIG. 4, each rib 42 has a width which is substantially smaller than the circumferential spacing between these ribs; and similarly, each rib 41 also has a width which is substantially smaller than the circumferential spacing between them. The outer ribs 42 are formed in staggered relationship with respect to the inner ribs 41, such that each inner rib 41 is disposed mid-way between each pair of adjacent outer ribs 42.

The outer faces of the outer ribs 42 are substantially flat and lie along a circle having a diameter slightly larger than the inner diameter of the outer cylindrical member 3 so as to permit the bushing sleeve 4 to be forcibly introduced into member 3 with a tight, non-rotatably press-fit; and the inner faces of the inner ribs 41 are also substantially flat and lie along a circle which is slightly smaller than the outer diameter of the inner bushing sleeve 5 so as to permit that bushing sleeve to be forcibly introduced into bushing sleeve 4 with a tight, non-rotatable press-fit.

The inner bushing sleeve 5 is formed with a central bore 51 having a diameter just slightly larger than the outer diameter of the inner cylindrical member 2 so as to permit the latter member to be rotatably received within the bore with a minimum of play. The outer end of sleeve 5 is formed with an annular flange 52 which limits against the end of the outer cylindrical member 3 for fixing the position of bushing sleeve 5 within that member.

FIG. 3 illustrates the assembled condition of the rotatable joint. In assembling the joint, the inner bushing sleeve 5 is first pressed into the outer bushing sleeve 4 until flange 52 of sleeve 5 limits against the edge of the outer sleeve 4. During the forcible insertion of the inner sleeve 5 into the outer sleeve 4, the engagement of the ribs 41 with the outer face of the inner sleeve 5 applies outward forces to the portions of the outer sleeve between its outer ribs 42, tending to distort these portions outwardly, so that the inner ribs 41 firmly and non-rotatably grip the inner sleeve 5. The outer sleeve 4, with the inner sleeve 5 firmly gripped therein, is then forcibly introduced into the outer cylindrical member 3 until flange 52 of the inner sleeve 5 limits against the end of member 3.

When the outer bushing sleeve 4 is forcibly introduced into the outer cylindrical member 3, the outer faces of the outer ribs 42 firmly engage the inner face of member 3 so as to non-rotatably press-fit sleeve 4 within member 3. It will be seen that during this forcible insertion of the outer sleeve 4, the inwardly directed forces applied by cylindrical member 3 are accomodated primarily by the distortion of the portions of the outer sleeve 4 between its inner ribs 41, and only a relatively small force is transmitted to the inner sleeve 5. The latter transmitted force effects a more firm gripping between ribs 41 of sleeve 4 and the outer face of sleeve 5.

Thus, the distortion of the inner bushing sleeve 5 is minimal so that bore 51 formed in the inner sleeve retains substantially its original dimensions to accomodate the inner cylindrical member 2 for rotation with substantially no play. Accordingly, the inner sleeve 5 may be produced with the required critically-dimensioned bore 51 for accomodating member 2 in a rotatable, substantially play-free manner and does not require a reaming operation to be performed after the bushing sleeves have been forcibly introduced into the outer cylindrical member 3 as in the previous constructions.

It will be appreciated that the inner bushing sleeve 5 may first be inserted into the outer sleeve 4, and then both applied to the outer cylindrical member 3; also, that flange 52 on the inner sleeve 5 could be omitted.

To simplify the manufacture of the bushing, the two bushing sleeves 4 and 5 are preferably produced as separate units and assembled together as described above. It is contemplated, however, that the two sleeves 4 and 5 may be formed as a single unit. This is shown in FIG. 5 wherein it will be seen that the bushing is constituted of a single unit integrally formed with the outer sleeve 104, the inner sleeve 105, the inner longitudinally-extending ribs 141 and the outer longitudinally-extending ribs 142.

It will also be appreciated that the provision of the inner and outer ribs (41, 42) on the outer bushing sleeve 4 inparts a flexibility to the sleeve, which flexibility accomodates the forces by distorting the outer sleeve, and thereby minimizes the distortion of the inner sleeve 5 when the two bushing sleeves are forcibly introduced into the outer cylindrical member 3. This flexibility depends on a number of factors, including the thickness of the outer sleeve 4, and the spacing of the longitudinally-extending ribs 41 and 42. Another factor affecting the flexibility of the outer sleeve 4 is the configuration of the ribs 41, 42. In the embodiment illustrated in FIG. 4 (and also in FIG. 5) the ribs are shown as being of substantially rectangular cross-section.

FIG. 6 illustrates a variation wherein the ribs, therein designated 241 and 242, are of trapezoidal cross-section decreasing in width in the direction away from the outer sleeve 204, thereby decreasing the flexibility and distortion of the outer bushing sleeve; and FIG. 7 illustrates a modification wherein the ribs, therein designated 341 and 342, are of trapezoidal cross-section but increasing in width in the direction away from the bushing sleeve 304, thereby increasing the flexibility and distortion of the outer bushing sleeve.

In all the foregoing constructions, both bushing sleeves (4 and 5) are preferably of hard plastics material, but could be of other materials, such as metal.

While the invention has been described with respect to two preferred embodiments, it will be appreciated that many other variations, modifications and applications of the invention may be made.

What is claimed is:

1. A coaxial joint for joining an inner cylindrical member to an outer cylindrical member by means of a bushing disposed therebetween, characterized in that said bushing includes:
   an outer sleeve non-rotatably receivable within said outer cylindrical member;
   an inner sleeve formed with a central bore for receiving said inner cylindrical member;
   a first group of longitudinally-extending, circumferentially-spaced ribs formed between said inner and outer sleeves with each such rib having a width which is substantially smaller than the circumferential spacing between ribs;
   and a second group of longitudinally-extending, circumferentially-spaced ribs each also having a width which is substantially smaller than the circumferential spacing between ribs, said second group of ribs being formed in staggered relationship with respect to said first group of ribs on the outer face of said outer sleeve and effective, when forcibly received within said outer cylindrical member, to distort inwardly the portions of said outer sleeve between said first group of ribs and thereby to minimize the distortion of said inner sleeve.

2. The joint according to claim 1, wherein said bushing includes two sections, namely an inner section comprising said inner sleeve, and an outer section comprising said outer sleeve and said two groups of ribs formed on its inner and outer faces, respectively.

3. The joint according to claim 1, wherein said bushing is made as a single unit integrally formed with said inner and outer sleeves and said two groups of ribs.

4. The joint according to claim 1, wherein said inner sleeve is formed with an annular flange at one end having a larger diameter than that of said outer cylindrical member for limiting against the end face thereof.

5. The joint according to claim 1, wherein each of said ribs in said first and second groups is of substantially rectangular section.

6. The joint according to claim 1, wherein each of said ribs in said first and second groups is of trapezoidal section.

7. The joint according to claim 6, wherein said ribs decrease in width in the direction away from the outer sleeve, thereby decreasing the flexibility and the distortion of the outer sleeve when forcibly received within the outer cylindrical member.

8. The joint according to claim 6, wherein said ribs increase in width in the direction away from the outer sleeve, thereby increasing the flexibility and the distortion of the outer sleeve when forcibly received within the outer cylindrical member.

9. The joint according to claim 1, wherein both said sleeves and both said groups of ribs are formed of plastics material.

10. A coaxial joint for joining an inner cylindrical member to an outer cylindrical member by means of a bushing disposed therebetween, said bushing including:
an outer sleeve non-rotatably receivable within said outer cylindrical member;
an inner sleeve formed with a central bore for receiving said inner cylindrical member;
a first group of longitudinally-extending, circumferentially-spaced ribs formed between said inner and outer sleeves with each such rib having a width which is substantially smaller than the circumferential spacing between ribs;
and a second group of longitudinally-extending, circumferentially-spaced ribs each also having a width which is substantially smaller than the circumferential spacing between ribs, said second group of ribs being formed in staggered relationship with respect to said first group of ribs on the outer face of said outer sleeve and effective, when forcibly received within said outer cylindrical member, to distort inwardly the portions of said outer sleeve between said first group of ribs and thereby to minimize the distortion of said inner sleeve;
said bushing consisting of two sections each of a hard plastics material, namely an inner section comprising said inner sleeve, and an outer section comprising said outer sleeve and said two groups of ribs formed on its inner and outer faces, respectively.

11. The joint according to claim 10, wherein said inner sleeve is formed with an annular flange at one end having a larger diameter than that of said outer cylindrical member for limiting against the end face thereof.

12. The joint according to claim 10, wherein each of said ribs in said first and second groups is of substantially rectangular section.

13. The joint according to claim 10, wherein each of said ribs in said first and second groups is of trapezoidal section.

14. The joint according to claim 13, wherein said ribs decrease in width in the direction away from the outer sleeve, thereby decreasing the flexibility and the distortion of the outer sleeve when forcibly received within the outer cylindrical member.

15. The joint according to claim 13, wherein said ribs increase in width in the direction away from the outer sleeve, thereby increasing the flexibility and the distortion of the outer sleeve when forcibly received within the outer cylindrical member.

16. A coaxial joint for joining an inner cylindrical member to an outer cylindrical member by means of a bushing disposed therebetween, characterized in that said bushing includes:
an outer sleeve non-rotatably receivable within said outer cylindrical member;
an inner sleeve formed with a central bore for receiving said inner cylindrical member;
a first group of longitudinally-extending, circumferentially-spaced ribs formed between said inner and outer sleeves with each such rib having a width which is substantially smaller than the circumferential spacing between ribs;
and a second group of longitudinally-extending, circumferentially-spaced ribs each also having a width which is substantially smaller than the circumferential spacing between ribs, said second group of ribs being formed in staggered relationship with respect to said first group of ribs on the outer face of said outer sleeve and effective, when forcibly received within said outer cylindrical member, to distort inwardly the portions of said outer sleeve between said first group of ribs and thereby to minimize the distortion of said inner sleeve;
said bushing consisting of a single unit of a hard plastics material integrally formed with said inner and outer sleeves and said two groups of ribs.

17. The joint according to claim 16, wherein said inner sleeve is formed with an annular flange at one end having a larger diameter than that of said outer cylindrical member for limiting against the end face thereof.

18. The joint according to claim 16, wherein each of said ribs in said first and second groups is of substantially rectangular section.

19. The joint according to claim 16, wherein said ribs decrease in width in the direction away from the outer sleeve, thereby decreasing the flexibility and the distortion of the outer sleeve when forcibly received within the outer cylindrical member.

20. The joint according to claim 16, wherein said ribs increase in width in the direction away from the outer sleeve, thereby increasing the flexibility and the distortion of the outer sleeve when forcibly received within the outer cylindrical member.

* * * * *